United States Patent Office 3,349,591
Patented Oct. 31, 1967

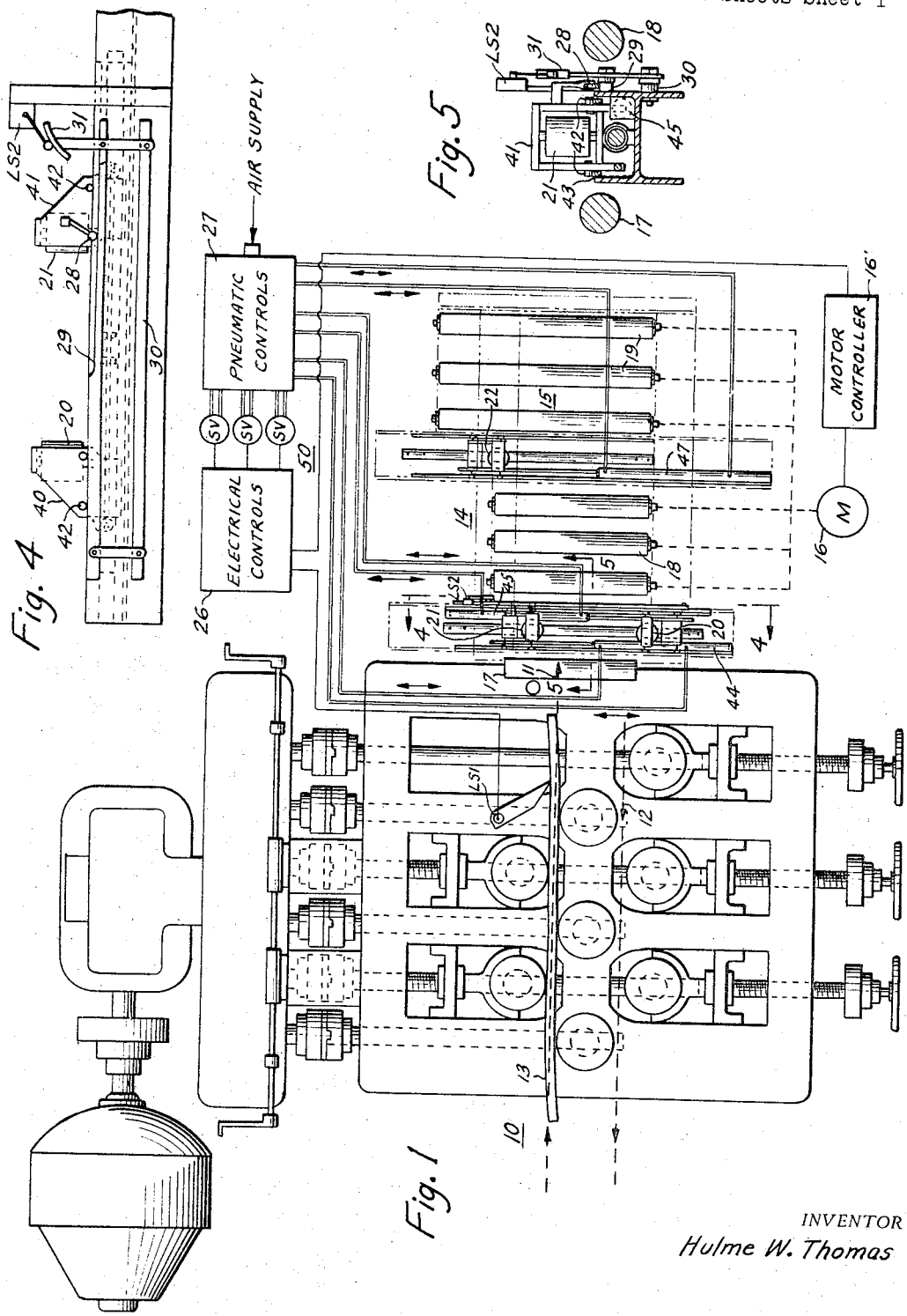

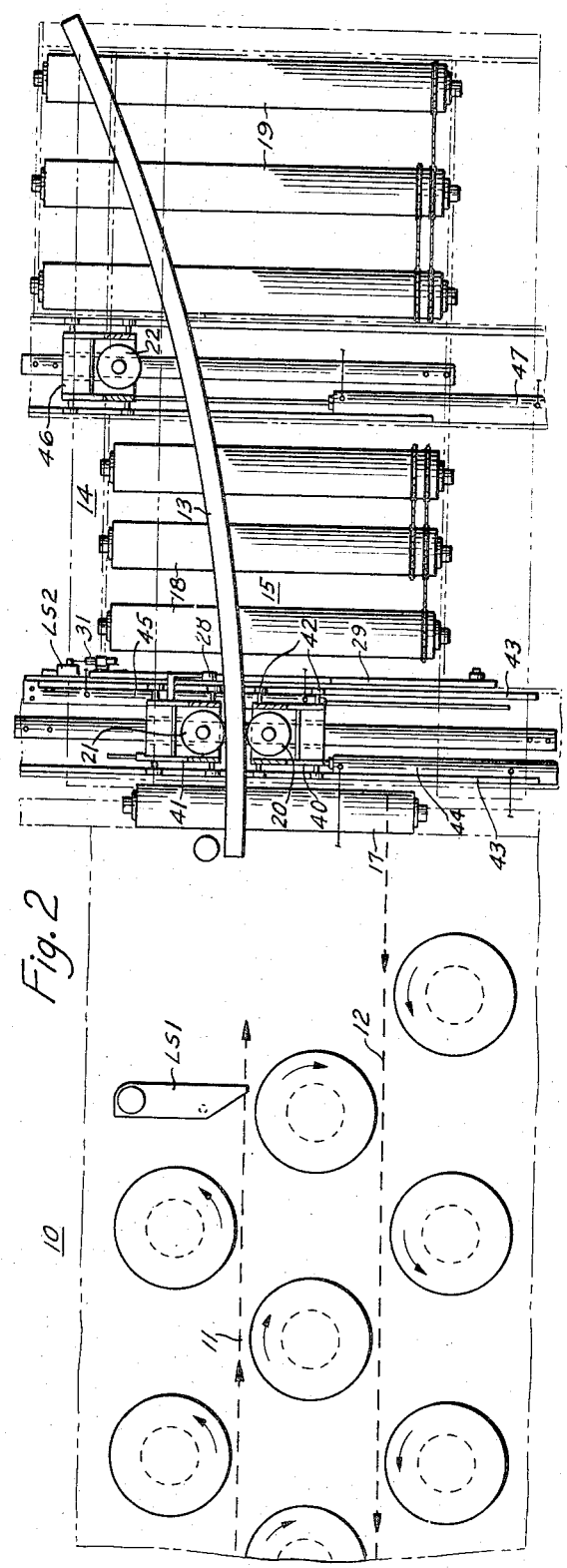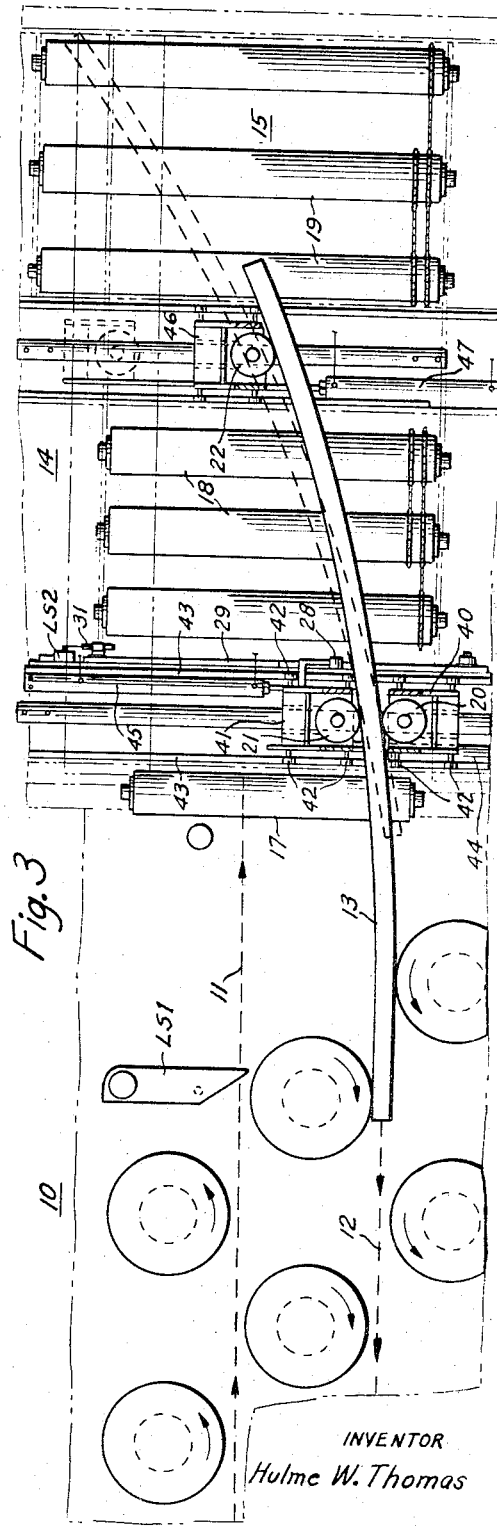

3,349,591
BAR POSITIONER
Hulme W. Thomas, Allentown, Pa., assignor to Bethlehem Steel Corporation, a corporation of Delaware
Filed Feb. 27, 1967, Ser. No. 618,926
3 Claims. (Cl. 72—24)

ABSTRACT OF THE DISCLOSURE

Apparatus for positioning a workpiece with respect to the working passes of a machine which includes an automatic feed table to position a bar discharged from a machine for reentry thereinto.

Background of the invention

This invention relates generally to bar feed tables and more particularly to apparatus adapted to automatically position a bar for entry into the working pass of a machine.

The straightening of flat bar product, in the bar finishing procedure, through the use of multi-roll, multi-pass straightening machines is well known. The problems attendant thereto are also recognized as, for example, the problem of repositioning a bar on discharge from a machine for reentry thereinto. Known procedure and apparatus includes discharging the bar onto a roller table where a helper using hand tools manipulates the bar into the reentry pass of the machine. The hazards of this type of operation are obvious. The necessity for the helper to apply a great amount of pressure to the end of the bar in an attempt to force it into the opening between the rotating elements of the straightening machine is also obvious. Furthermore, in the case of flats particularly, there is a tendency for the bar to turn over on the table thus necessitating additional manipulation to right the bar before attempting to reposition it for proper alignment into the next pass.

Summary of the invention

It is, therefore, an object of this invention to provide means for the positive repositioning of a workpiece between two passes of a machine.

It is also an object of this invention to provide automatic means for the manipulation of a workpiece from one pass of a machine to another.

A further object of this invention is to provide a controlled timed sequence of operations for automatically repositioning a workpiece.

The instant invention provides apparatus for automatically manipulating a bar to reposition it from the discharge pass of a machine to a reentry pass including electrical and pneumatic control means reponsive to the position of the bar eliminating the necessity of manipulation of the bar by a helper.

Brief description of the drawings

FIGURE 1 is a plan view of the bar positioning apparatus showing the bar emerging from a bar straightening machine;

FIGURE 2 is an enlarged fragmentary view of the bar positioning apparatus showing the bar resting on the bar positioner prior to repositioning;

FIGURE 3 is an enlarged fragmentary view similar to FIGURE 2 showing two positions of the bar approaching the reentry pass of the straightening machine;

FIGURE 4 is a sectional view of the apparatus shown in FIGURE 1 taken on line 4—4, and FIGURE 5 is a sectional view of the apparatus shown in FIGURE 1 taken on line 5—5.

Description of the preferred embodiment

Referring now to the figures and particularly to FIG. 1, the instant invention is seen as applied to a multi-roll, two-pass vertical roll bar straightening machine 10 having a discharge pass 11 and a reentry pass 12. The particular arrangement of the vertical rolls of the straightening machine 10 define the pass lines 11 and 12. The straightening machine is used to straighten flat product by feeding a workpiece 13 into the first pass or, as described above, the discharge pass 11 of the machine, discharging said workpiece onto bar positioning apparatus 14 for receiving and conveying the workpiece to reposition it for reentry into the second or reentry pass 12 of the machine 10.

A bar straightening machine motor controller (not shown) is provided with an interlocking device which cuts the power source to the bar positioning apparatus 14 when the straightening machine is not running for any reason, as a safety feature to prevent wrecks. Means for signalling the arrival or departure of a workpiece relative to a station along the discharge pass line 11 comprises first detector LS1 positioned on the straightening machine housing adjacent to the bar positioning apparatus 14. The first detector LS1 as shown in the preferred embodiment includes a limit switch but other detector means, e.g., a proximity switch, could be adapted as well.

The bar positioning apparatus 14 comprises a reversible roller table 15 having a proximal end adjacent to the straightening machine 10 and a distal end outward therefrom, a pair of movable opposed vertical idler rolls 20 and 21, a third movable vertical roll 22 and means for positioning the vertical rolls. Roller table 15 is arranged as shown in FIG. 1 with an idler roller 17 adjacent the straightening machine and six driven rollers 18 and 19. A reversible controller 16′ is provided for roller table drive motor 16 to power the driven rollers 18 and 19 to carry said workpiece 13 away from the straightening machine on discharge therefrom and thereafter to reverse the roller table direction to carry said workpiece toward the reentry pass of the machine. The three rollers 19 mounted furthermost from the machine 10 are seen to be longer than the first three driven rollers 18. This arrangement is to accommodate the leading end of said workpiece which is bowed by the first pass through the straightener, a condition which is inherent in this method of bar straightening and which will be readily understood by those skilled in the art.

Referring particularly now to FIGS. 4 and 5, the opposed vertical rolls 20 and 21 are seen to be mounted in frames 40 and 41, respectively, adapted to be moved transversely of the roller table 15 toward and away from each other or substantially in unison as will be evident from later description of the operation of the apparatus. The frames 40 and 41 are equipped with cam rolls 42 which support said frames for travel on tracks 43. The movable roll frames 40 and 41 are mounted on the roller table frame adjacent the proximal end thereof and are initially positioned on opposite sides of said roller table. The means for positioning the vertical roll frames 40 and 41 include pneumatic cylinders 44 and 45 the rod ends of which are attached to frames 40 and 41 respectively. The third vertical roll 22 mounted in frame 46 similarly to vertical rolls 20 and 21 with its positioning means including pneumatic cylinder 47 is located intermediate said ends of said roller table also adapted for movement transversely thereof and initially in approximate alignment with the discharge pass 11 of said machine 10 although it is seen to be slightly offset therefrom to accommodate the bowed workpiece described heretofore.

A second detector means LS2 for signalling the position of said workpiece 13 relative to said reentry pass comprises a limit switch mounted as shown in FIG. 4. As heretofore mentioned, it is obvious that the selection of a particular type of position sensing means is a matter of choice and availability. The limit switch LS2 is mounted on one side of said roller table frame and is actuated by curved bar 31 which is rotated forward against LS2 when cam surface 29, which is mechanically linked to a fixed bar 30, is depressed by cam follower 28. The cam follower 28 is fixed to the roll frame 41 and follows the cam surface 29 as said roll frame is moved transversely of the roller table in the operation of the bar positioning apparatus 14.

The control system 50 for the bar positioning apparatus 14 is illustrated in schematic form in FIG. 1 to which particular reference is now made. In this control system the sequence of operations of the bar positioner, including the roller table and the vertical roll positioning means, is controlled by controller means adapted to receive the signals of said detectors according to a predetermined timed sequence. The control system 50 is seen to comprise, in addition to the detectors LS1 and LS2, a table drive motor 16 and reversible motor controller 16', pneumatic control system 27 and electrical control system 26. The reversible controller 16' for said roller table drive motor 16, a plurality of positioning means controllers and a plurality of control logic devices are arranged in circuit with said detectors to provide means for controlling the reversible roller table and the movable vertical rolls to automatically feed said workpiece delivered from the discharge pass of said machine to the reentry pass. It is not necessary to an understanding of this invention to enumerate the control logic devices included in pneumatic and electrical control systems as they comprise well-known conventional items as e.g., time delay relays—both electrical and air operated, solenoid valves, etc., adaptable in various combinations and ararngements to accomplish the invention herein described.

Referring to the figures generally and to FIGS. 1, 2 and 3 particularly a description of the operation follows. A bar or workpiece 13 is fed into a bar straightening machine 10 which has been set in motion by activation of its drive motor and controller which supplies an interlocking signal to the bar positioner apparatus start/stop control. A control voltage of e.g., 230 A.C., is supplied to the bar positioner start/stop control and the entire control system for the automatic bar positioner is subsequently under control of said start/stop control. The leading edge of the workpiece 13 emerging from the discharge pass 11 of the machine 10 activates the first detector LS1 to cause the roller table 15 to rotate in the direction of movement of the workpiece thus carrying the workpiece toward the distal end of the roller table. The activation of the means for positioning the pair of opposed vertical rolls 20 and 21 is also caused by the activation of first detector LS1 to move said opposed rolls on a timed sequence into engagement with the workpiece therebetween to form a guide for said workpiece along the discharge line.

As the trailing edge of the workpiece clears the first detector LS1 the limit switch is reset causing said roller table to stop after a short time delay and activates the positioning means 44 and 45 to actuate said pair of opposed rolls 20 and 21 for lateral movement toward the reentry pass 12. The trailing edge of the workpiece 13 is thus moved laterally across the table to a position approximately in alignment with the reentry pass 12 of the machine 10. The leading edge of said workpiece remains at the distal end of said roller table adjacent to the third vertical roll which is at this time inactive.

The lateral movement of said pair of rolls 20 and 21 moving in unison acts on said second detector LS2 to cause said roller table to rotate in a direction toward said machine 10. The actuation of said third vertical roll positioning means 47 is also caused by the activation of said second detector or limit switch LS2 to move said leading edge of said workpiece 13 toward said reentry pass line 12. It is obvious that said workpiece is moved longitudinally by action of the rotating table rollers as well as laterally by said third vertical roll. As the end of said workpiece enters the reentry pass 12, formed by the rolls of said straightening machine, pressure is required to force said end into frictional engagement with the rotating rolls of said machine. This necessary force or pressure is applied by said third vertical roll as it nears the end of its lateral movement. The rolls of said machine thus grip the workpiece and pull it into said machine for the final straightening pass. The activation of said second detector LS2 also activates an electrically timed sequence to cause said roller table drive to be de-energized and each of said vertical roll positioners to be restored to their initial positions.

Thus it is seen that the instant invention provides a simple positive means for the automatic manipulation of a workpiece from the discharge pass of a machine to a reentry pass thereof. The instant invention avoids the hazards associated with manual handling of a workpiece and is relatively inexpensive to construct and maintain.

I claim:
1. Apparatus for receiving a workpiece discharged from a machine, having a discharge and re-entry pass, to reposition said workpiece and to re-enter it into said machine, comprising:
   (a) a reversible roller table, having a proximal and a distal end, for receiving and conveying said workpiece including motor means for driving said roller table,
   (b) a pair of opposed vertical idler rolls, mounted adjacent said proximal end of said roller table movable substantially in unison transverse of said roller table including means for positioning said rolls with respect to the passes of said machine,
   (c) a third movable vertical idler roll positioned intermediate said ends of said roller table in approximate alignment with the discharge pass of said machine including means for positioning said roll independent of said pair of rolls,
   (d) control means for controlling the reversible roller table and the movable vertical rolls in a predetermined timed sequence, whereby the workpiece delivered from the discharge pass of said machine is automatically fed to the re-entry pass.

2. Apparatus according to claim 1 wherein the means recited in subparagraph (d) comprises:
   a first detector for signalling the arrival and departure of said workpiece relative to a station along said discharge pass line,
   a second detector for signalling the position of said workpiece relative to said re-entry pass line, and
   controller means adapted to receive the signals of said detectors and control the operations of said roller table and each of the positioning means according to said timed sequence.

3. Apparatus according to claim 2 wherein said controller means comprises:
   a reversible controller for said roller table motor, a plurality of positioning means controllers, and control logic devices arranged in circuit with said controllers and said detectors, whereby
      the leading edge of said workpiece activates said first detector (i) to cause said roller table to rotate in the direction of movement of said workpiece, (ii) to cause activation of said positioning means to guide said workpiece along the discharge pass line;
      the trailing edge of said workpiece deactivates said first detector (i) to cause said roller table to stop, (ii) to cause activation of said positioning means for actuating said pair of rolls for lateral movement toward the re-entry pass,
      the lateral movement of said pair of rolls acting on said second detector (i) to cause said roller table to rotate in a direction toward said machine, (ii) to cause actuation of said third vertical roll positioning means to move said leading edge of said workpiece toward said re-entry pass line, and (iii) thereafter to cause said roller table drive to be deenergized and each of said vertical roll positioners restored to their initial positions.

References Cited

UNITED STATES PATENTS

| | | | |
|---|---|---|---|
| 2,815,111 | 12/1957 | Capps et al. | 198—29 |
| 2,818,954 | 1/1958 | Vice | 193—35 |
| 3,131,799 | 5/1964 | Ribeton | 193—35 |

CHARLES W. LANHAM, *Primary Examiner.*

H. D. HOINKES, *Assistant Examiner.*